United States Patent
Cho et al.

(10) Patent No.: US 7,622,084 B2
(45) Date of Patent: Nov. 24, 2009

(54) MOBILE PHONE HAVING PERFUME SPRAYING APPARATUS

(75) Inventors: Woo-jong Cho, Suwon-si (KR); Seung-wan Lee, Suwon-si (KR); Jong-hwa Won, Seoul (KR); Sang-on Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 294 days.

(21) Appl. No.: 11/229,860

(22) Filed: Sep. 20, 2005

(65) Prior Publication Data
US 2006/0062408 A1    Mar. 23, 2006

(30) Foreign Application Priority Data
Sep. 20, 2004    (KR) ...................... 10-2004-0075080

(51) Int. Cl.
*A61L 9/00* (2006.01)
(52) U.S. Cl. ................... 422/123; 422/124; 422/125
(58) Field of Classification Search ........................ None
See application file for complete search history.

(56) References Cited

U.S. PATENT DOCUMENTS

| 7,152,758 | B2 * | 12/2006 | Fazzio et al. | 222/145.1 |
| 2004/0003812 | A1 * | 1/2004 | Manne | 128/204.11 |
| 2004/0204043 | A1 * | 10/2004 | Wang et al. | 455/556.1 |

FOREIGN PATENT DOCUMENTS

DE    20115776 U1 *    3/2002
KR    10-2001-0078935    8/2001

* cited by examiner

*Primary Examiner*—Elizabeth L McKane
(74) *Attorney, Agent, or Firm*—Harness, Dickey & Pierce, P.L.C.

(57) ABSTRACT

A mobile phone including a perfume spraying apparatus, the perfume spraying apparatus including a perfume storage unit capable of storing at least one perfume type and a perfume spraying unit, wherein the perfume spraying unit includes a perfume chamber coupled to the perfume storage unit by a perfume flow path, a pressure unit to pressurize the perfume chamber, and a nozzle to spray perfume outside the mobile phone. The mobile phone may include a control unit to instruct the perfume spraying apparatus to spray perfume when a button of the mobile phone is pushed and/or when the mobile phone is called and may change a type or amount of perfume sprayed according to an increase or decrease in a user's voice volume, according to a caller, according to a user customization and/or according to a noise change in a user's surroundings.

16 Claims, 3 Drawing Sheets

MOBILE PHONE HAVING PERFUME SPRAYING APPARATUS

BACKGROUND OF THE INVENTION

1. Field of the Invention

The present invention relates to a mobile phone, and more particularly, to a mobile phone having a perfume spraying apparatus.

2. Description of the Related Art

A mobile phone is typically a small and lightweight phone, e.g., a cellular phone, which may be easily carried or stored in a bag or pocket. A mobile phone is a development of a car phone and communicates with a base station or another mobile phone wirelessly. Generally, the mobile phone is equipped with a variety of functions such as a total call time display, a management display, a missed call display, an answering reject display, a ring during a call, an auto redial feature, a caller ID display, a password feature to lock the phone, an automatic message sending feature, a search function for a phone number, etc.

A mobile phone may incorporate a perfume spraying apparatus to satisfy a user's desires. However, if an amount of sprayed perfume cannot be minutely controlled using the perfume spraying apparatus and cannot equalize a size of a sprayed perfume particle, the perfume may stain the mobile phone or the user's clothes. Also, if the perfume spraying apparatus requires an opening/closing unit, its size may be too large and it may require a complicated mechanism for spraying perfume. Thus, it may be difficult to embed a perfume spraying apparatus in a small and lightweight mobile phone. Furthermore, if the perfume spraying apparatus requires multiple perfume spraying units in order to spray various types of perfume, the perfume spraying apparatus may be too large to be easily embedded in the mobile phone.

SUMMARY OF THE INVENTION

The present invention is therefore directed to a mobile phone having a perfume spraying apparatus that substantially overcomes one or more of the problems due to the limitations and disadvantages of the related art.

It is therefore a feature of an embodiment of the present invention to provide a mobile phone having a perfume spraying apparatus that minutely controls an amount of sprayed perfume.

It is therefore another feature of an embodiment of the present invention to provide a mobile phone having a perfume spraying apparatus that sprays perfume without using an opening/closing unit and has a simple mechanism for spraying perfume.

It is therefore also a feature of an embodiment of the present invention to provide a mobile phone having a perfume spraying apparatus including a small perfume spraying unit that can spray various types of perfume.

At least one of the above and other features and advantages of the present invention may be realized by providing a mobile phone including a perfume spraying apparatus, the perfume spraying apparatus including a perfume storage unit capable of storing at least one perfume type and a perfume spraying unit, wherein the perfume spraying unit includes a perfume chamber coupled to the perfume storage unit by a perfume flow path, a pressure unit to pressurize the perfume chamber, and a nozzle to spray perfume outside the mobile phone.

The pressure unit may include a heater to heat the perfume stored in the perfume chamber, a piezoelectric element unit to pressurize perfume stored in the perfume chamber and/or an ultrasonic exciting unit to excite perfume stored in the perfume chamber. The perfume storage unit may be disposed in an exchangeable cartridge and the perfume storage unit and the perfume spraying unit are disposed in the exchangeable cartridge. The perfume spraying unit may be formed from a silicon wafer. The perfume storage unit may be capable of storing a plurality of perfume types concurrently and the perfume spraying apparatus may include a plurality of perfume spraying units corresponding to the plurality of perfume types.

The mobile phone may also include a driver unit to provide an electrical signal to the perfume spraying unit, wherein the electrical signal causes the perfume spraying unit to spray perfume. The driver unit may be electrically connected to the perfume spraying unit, the driver unit may be electrically connected to the pressure unit and the driver unit and the perfume spraying unit may be reversibly separable from each other.

The mobile phone may also include a control unit to instruct the perfume spraying apparatus to spray perfume. The control unit may transmit a control signal to the perfume spraying unit when a button of the mobile phone is pushed, may transmit a control signal to the perfume spraying unit when the mobile phone is called, may transmit a control signal to the perfume spraying unit to change a type or amount of perfume sprayed according to an increase or decrease in a user's voice volume, may transmit a control signal to the perfume spraying unit to change a type of perfume according to a caller, may transmit a control signal to the perfume spraying unit to change a type or amount of perfume sprayed according to a user customization and may transmit a control signal to the perfume spraying unit to change a type or amount of perfume sprayed according to a noise change in a user's surroundings.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
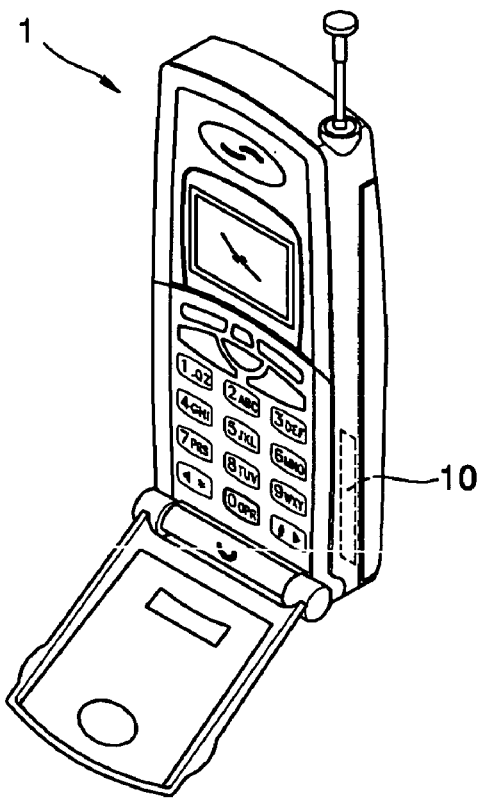
FIG. 1 illustrates a front perspective view of a mobile phone having a perfume spraying apparatus according to an embodiment of the present invention.

Korean Patent Application No. 10-2004-0075080, filed on Sep. 20, 2004, in the Korean Intellectual Property Office, and entitled: "Cellular Phone Having Perfume Spraying Apparatus," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. Like reference numerals refer to like elements throughout.

Figure 2:
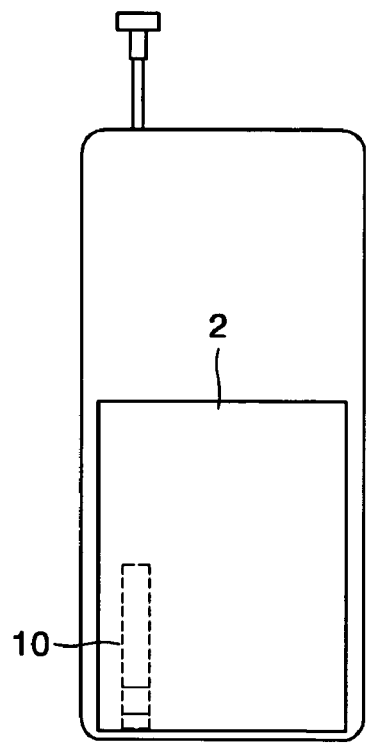
FIG. 2 illustrates a back view of the mobile phone according to an embodiment of the present invention.

FIG. 1 illustrates a front perspective view of a mobile phone having a perfume spraying apparatus according to an embodiment of the present invention. FIG. 2 illustrates a back view of the mobile phone according to an embodiment of the present invention. Referring to FIGS. 1 and 2, a mobile phone 1 may include a perfume spraying apparatus 10 and a battery pack 2 disposed in the backside of the mobile phone 1. The perfume spraying apparatus 10 may be used to spray perfume outside the mobile phone 1 according to an input signal from a control unit. The perfume spraying apparatus 10 may be embedded in the mobile phone 1, and may be covered by the battery pack 2.

Figure 3:
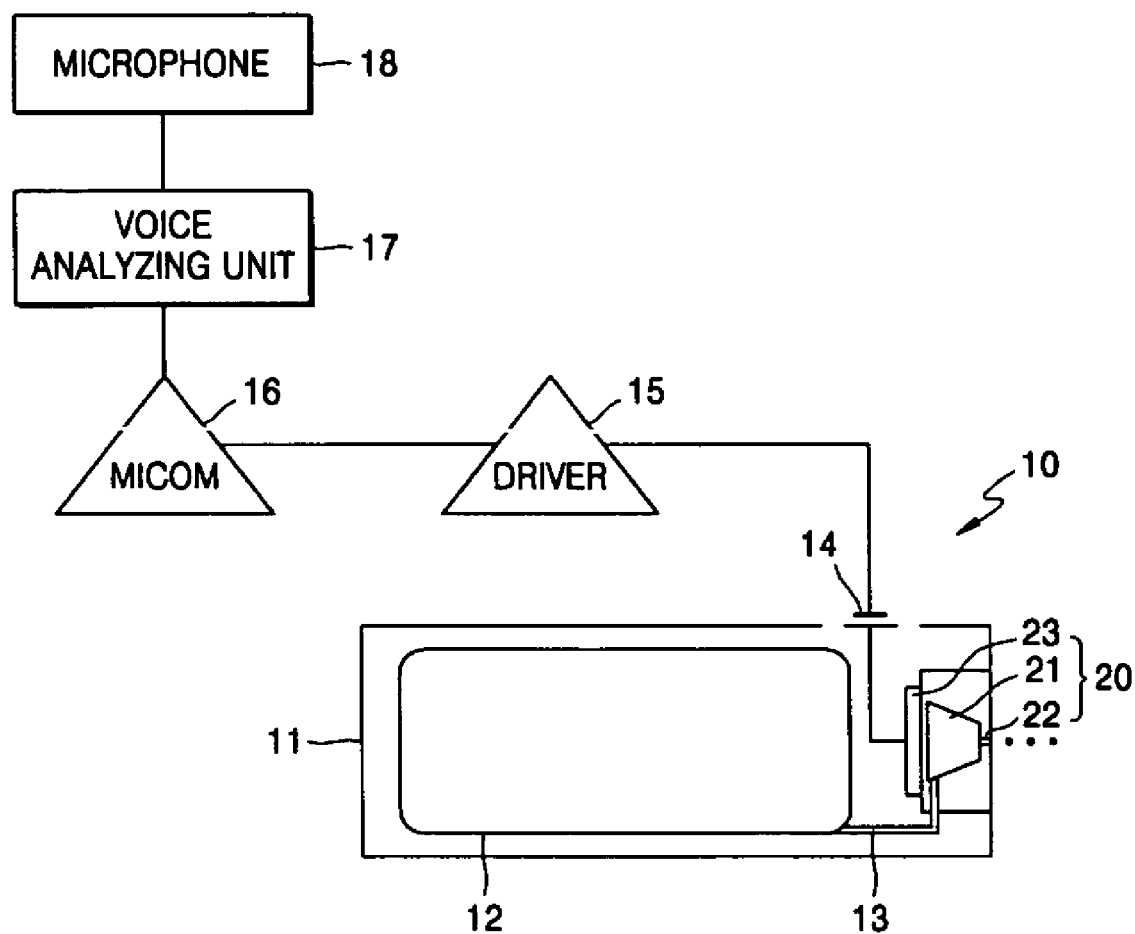
FIG. 3 illustrates a perfume spraying apparatus according to an embodiment of the present invention.
Figure 4:
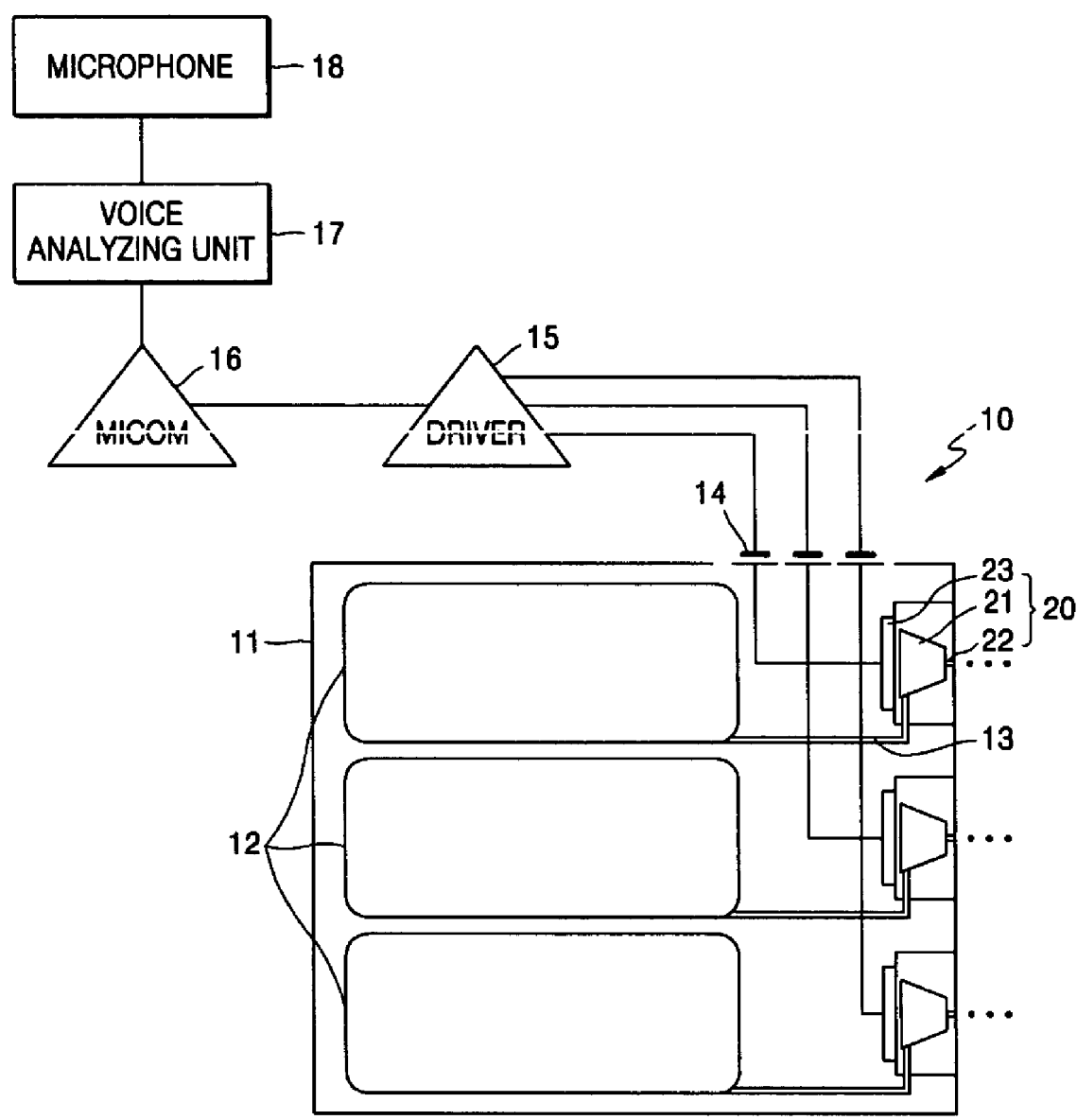
FIG. 4 illustrates a perfume spraying apparatus according to another embodiment of the present invention.

FIG. 3 illustrates a perfume spraying apparatus according to an embodiment of the present invention. FIG. 4 illustrates a perfume spraying apparatus according to another embodiment of the present invention. Referring to FIGS. 3 and 4, the perfume spraying apparatus 10 may include a cartridge 11, a perfume storage unit 12 embedded in the cartridge 11, a perfume passage 13 extended from a side of the perfume storage unit 12 and a perfume spraying unit 20 connected to the perfume passage 13. The perfume spraying unit 20 may be connected to a driver unit 15 and a microcomputer (micom) 16 through an electrical contact 14. The micom 16 may be connected to a voice analyzing unit 17.

A variety of parts of the perfume spraying apparatus 10 may be embedded in the cartridge 11. The parts in the cartridge 11 may be easily replaced by exchanging the cartridge 11 only. The perfume storage unit 12 may be contained in the cartridge 11. Thus, the cartridge 11 may be attached/detached in order to refill or exchange perfume stored in the perfume storage unit 12. The perfume storage unit 12 and perfume spraying unit 20 may be contained in the cartridge 11. Thus, it may be easy to repair or exchange the parts of the perfume spraying unit 20. The perfume storage unit 12 may store perfume and may be connected to the perfume passage 13. The perfume passage 13 may be used to supply the stored perfume.

The perfume spraying unit 20 may spray perfume according to an input signal and may include a chamber 21 connected to the perfume passage 13, a nozzle 22 to spray perfume stored in the chamber 21 and a pressure unit 23 for pressurizing the perfume stored in the chamber 21. The perfume spraying unit 20 may be manufactured from a silicon wafer in a semiconductor manufacturing process including, e.g., a micro electro-mechanical systems (MEMS) manufacturing process.

The chamber 21 may be used to store perfume transferred from the perfume storage unit 12. The nozzle 22 is a passage where the perfume stored in the chamber 21 is sprayed to the outside by a spraying pressure applied by the pressure unit 23. The pressure unit 23 may include a heater, a piezoelectric unit and/or an ultrasonic wave exciting unit.

When the pressure unit 23 includes a heater, the heater may be used to heat the perfume stored in the chamber 21. The perfume heated by the heater forms bubbles and is sprayed outside through the nozzle 22 by an expansion pressure of the bubbles.

When the pressure unit 23 includes a piezoelectric element unit, the piezoelectric element unit is used to pressurize the perfume stored in the chamber 21 by piezoelectricity. The piezoelectric element may be quartz, tourmaline, Rochelle salt, etc., and may include artificial crystals such as barium titanate, ammonium dihydrogen phosphate, tartaric acid ethylenediamine, etc. The piezoelectric phenomenon is used to convert an electrical energy into mechanical energy and pressure into an electrical signal. When an electrical signal is input to a piezoelectric element of the pressure unit 23, the piezoelectric element converts the electrical signal into pressure applied to the perfume stored in the chamber 21.

When the pressure unit 23 includes the ultrasonic wave exciting unit, the ultrasonic exciting unit produces vibration, which results in pressure applied to the perfume stored in the chamber 21. Ultrasonic typically refers to a sound wave having a frequency of more than 20 KHz, i.e., an inaudible frequency. Since the ultrasonic wave has a high frequency and short wavelength, it may produce a very strong vibration to vibrate a material. When an electrical signal is input to the ultrasonic exciting unit, the vibration is produced to transform the perfume stored in the chamber 21 into minute particles that are sprayed outside through the nozzle 22.

In view of the above, embodiments of the present invention may allow for an amount of sprayed perfume to be easily controlled. Accordingly, the mobile phone 1 need not have an opening/closing unit and may have a simple mechanism for spraying the perfume.

The micom 16 may generate a control signal corresponding to the operation of the mobile phone 1. The driver 15 generates an operational signal corresponding to the control signal. A microphone 18 is used to convert a user's voice signal into the electrical signal. The electrical signal converted by the microphone 18 is then transferred to and analyzed in the voice analyzing unit 17.

As illustrated in FIG. 4, the perfume spraying apparatus 10 may include a plurality of perfume storage units 12, a plurality of perfume passages 13, a plurality of electrical contacts 14 and a plurality of perfume spraying units 20. Each of the plurality of the perfume storage units 12 may store a different type of perfume and each of the plurality of perfume spraying units 20 may be connected to the plurality of the perfume storage units 12 to spray a different type of perfume. Accordingly, it may be possible to combine and spray various types of perfume.

Operation of the mobile phone 1 to spray perfume according to an embodiment of the present invention will now be described. When the mobile phone 1 sprays perfume, the micom 16 generates a control signal. The control signal is transferred to the driver 15 and is converted into an operational signal in the driver 15. The operational signal is transferred to the pressure unit 23 through the electrical contact 14, the chamber 21 stores the perfume received from the perfume storage units 12 and the spraying pressure producing unit 23 generates a spraying pressure for the perfume. When the pressure unit 23 includes a heater, the heater heats the perfume stored in the chamber 21 in order to form a bubble in the perfume and produce pressure. When the pressure unit 23 includes a piezoelectric element unit, the piezoelectric element converts the electrical signal into pressure energy by piezoelectricity to pressurize the perfume. When the spraying pressure producing unit 23 includes an ultrasonic exciting unit, the ultrasonic exciting unit produces vibration to transform the perfume stored in the chamber 21 into minute particles in order to allow the particle to be sprayed outside through the nozzle 22. When the pressure unit 23 applies pressure on the perfume stored in the chamber 21, the perfume is sprayed outside the mobile phone 1 through the nozzle 22.

The mobile phone 1 having the perfume spraying apparatus 10 may precisely control the amount of sprayed perfume and may be miniaturized due to its simple mechanism. Therefore, the mobile phone 1 may have a wide range of applications. For example, the perfume spraying unit 20 may spray perfume according to a change in a user's voice during a call. In particular, when the user of the mobile phone 1 raises or lowers his/her voice, the voice analyzing unit 17 analyzes the change in the user's voice and transfers the analysis result to the micom 16. The micom 16 receives the analysis result and sends a control signal in accordance with the change in the user's voice, so that the perfume spraying apparatus 10 can spray perfume through the driver 15. The perfume spraying apparatus 10 may also spray perfume according to a noise change in the user's surroundings.

As another example, the perfume spraying apparatus 10 may spray perfume according to a voice of a person who talks to the user of the mobile phone 1. In particular, when the user calls the person, or the person calls the user, the micom 16 recognizes the person and displays information on the person on the screen of the mobile phone 1. The micom 16 compares perfume information on persons stored in advance therein with the displayed information and sends a control signal according to the recognized person. Thus, the perfume spraying apparatus 10 may spray a different type of perfume through the driver 15 for each person who talks to the user of the mobile phone 1.

In yet another example, the perfume spraying apparatus 10 may spray perfume in accordance with information customized by an owner of the mobile phone 1. In particular, the micom 16 sends a suitable control signal to the perfume apparatus 10, so that the perfume spraying apparatus 10 can spray an amount of perfume of a certain type according to the owner's desire.

The mobile phone 1 disclosed herein may spray perfume using the perfume spraying apparatus 10, which may include a heater, piezoelectric element unit, or ultrasonic exciting unit, and may minutely control the amount of sprayed perfume and equalize the size of the sprayed perfume particle. The mobile phone 1 having the perfume spraying apparatus 10 may also spray perfume without an opening/closing unit and may have a simple mechanism for spraying perfume. Further, the mobile phone 1 having the perfume spraying apparatus 10 may have a small perfume spraying unit and may spray various types of perfume.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A mobile phone including a perfume spraying apparatus embedded in the mobile phone, the perfume spraying apparatus comprising:
   a perfume storage unit capable of storing at least one perfume type;
   a perfume spraying unit, wherein the perfume spraying unit includes:
      a perfume chamber, the perfume chamber and the perfume storage unit being discrete units, and the perfume chamber being coupled to the perfume storage unit by a perfume flow path;
      a pressure unit configured to control pressure solely in the perfume chamber, the pressure unit overlapping at least one side of the perfume chamber; and
      a nozzle to spray perfume outside the mobile phone,
   a control unit configured to transmit control signals to the perfume spraying unit, the control signals being configured to activate the perfume spraying unit to spray perfume; and
   a voice analyzing unit configured to convert sounds into electrical signals,
   wherein the perfume storage unit and the perfume spraying unit are contained in a cartridge, the cartridge being removable attached/detached to the mobile phone, and
   the control unit is configured to transmit the control signals to the perfume spraying unit to change a type or amount of perfume according to the electrical signals from the voice analyzing unit, the electrical signals from the voice analyzing unit being configured to indicate at least one of an increase/decrease in a user's voice volume and a noise change in a user's surroundings.

2. The mobile phone of claim 1, wherein the pressure unit comprises a heater to heat the perfume stored in the perfume chamber.

3. The mobile phone of claim 1, wherein the pressure unit comprises a piezoelectric element unit to pressurize perfume stored in the perfume chamber.

4. The mobile phone of claim 1, wherein the pressure unit comprises an ultrasonic exciting unit to excite perfume stored in the perfume chamber.

5. The mobile phone of claim 1, wherein the perfume storage unit and the perfume spraying unit are disposed in an exchangeable cartridge.

6. The mobile phone of claim 5, wherein only the perfume storage unit and the perfume spraying unit are disposed in the exchangeable cartridge, the perfume spraying unit being electrically connected to the mobile phone via an electrical contact.

7. The mobile phone of claim 1, wherein the perfume spraying unit is formed from a silicon wafer.

8. The mobile phone of claim 7, wherein the perfume chamber, the perfume flow path, the nozzle, and the pressure unit are each formed from the silicon wafer.

9. The mobile phone of claim 1, wherein the perfume storage unit includes a plurality of containers capable of storing a plurality of perfume types concurrently, and wherein the perfume spraying apparatus includes a plurality of perfume spraying units, each perfume spraying apparatus corresponding to a respective container of the plurality of containers in the perfume storage unit.

10. The mobile phone of claim 1, further comprising a driver unit electrically connected to the perfume spraying unit, the driver unit being external to the spraying apparatus.

11. The mobile phone of claim 9, wherein the driver unit is electrically connected to the pressure unit.

12. The mobile phone of claim 11, wherein the electrical connection between the driver unit and the pressure unit is an only direct electrical connection between the perfume spraying apparatus and the mobile phone.

13. The mobile phone of claim 9, wherein the driver unit and the perfume spraying unit are reversibly separable from each other.

14. The mobile phone of claim 1, wherein the control unit is configured to transmit the control signals to the perfume spraying unit if a button of the mobile phone is pushed.

15. The mobile phone of claim 1, wherein the control unit is configured to transmit the control signals to the perfume spraying unit if the mobile phone is called.

16. The mobile phone of claim 1, wherein the pressure unit is between the perfume chamber and the perfume storage unit.

* * * * *